United States Patent [19]

Kressner

[11] 4,311,489
[45] Jan. 19, 1982

[54] COATED ABRASIVE HAVING BRITTLE AGGLOMERATES OF ABRASIVE GRAIN

[75] Inventor: Bernhardt E. Kressner, Pittsford, N.Y.

[73] Assignee: Norton Company, Worcester, Mass.

[21] Appl. No.: 129,186

[22] Filed: Mar. 10, 1980

Related U.S. Application Data

[63] Continuation-in-part of Ser. No. 931,035, Aug. 4, 1978, abandoned.

[51] Int. Cl.³ ............................................. B61L 29/08
[52] U.S. Cl. ....................................... 51/298; 51/307; 51/308; 51/295
[58] Field of Search ................. 51/295, 307, 298, 308

[56] References Cited

U.S. PATENT DOCUMENTS

| | | | |
|---|---|---|---|
| 2,194,472 | 3/1940 | Jackson | 51/185 |
| 2,308,981 | 1/1943 | Kistler | 51/295 |
| 2,358,313 | 9/1944 | Brown | 51/309 |
| 2,877,103 | 3/1959 | Lane | 51/298 |
| 3,916,584 | 11/1975 | Howard | 51/308 |
| 3,928,949 | 12/1975 | Wagner | 51/401 |

*Primary Examiner*—Sam Silverberg
*Attorney, Agent, or Firm*—Rufus M. Franklin

[57] ABSTRACT

A coated abrasive product has abrasive particles secured to a flexible backing by maker and size coats, each abrasive particle consisting essentially of an agglomerate of fine abrasive grains having an average diameter less than about 200 microns and an inorganic, brittle, matrix. The volume percent of the matrix solids in each agglomerate is from 45 to 75% of the total solids volume of the agglomerate. The agglomerates have an irregular surface permitting a bond to the maker and size coats which is stronger than the crush strength of the agglomerates to permit gradual wearing down of the agglomerates during grinding by gradual removal of dulled abrasive grains from the agglomerates.

2 Claims, 10 Drawing Figures given EROC(g/m) = 18.0

| RC(%) | TC(g) | L(m) | A(g/m) | I(g/m) | S | RCF | INT |
|---|---|---|---|---|---|---|---|
| 437 | 215.7 | 7.2 | 30.1 | 37.3 | -0.940 | 0.9999 | 20 |
| 100 | 49.4 | 1.8 | 27.0 | 30.7 | -0.867 | 0.9981 | 7 |

FINISH vs TIME
RATE vs TIME

FINISH vs TIME
RATE vs TIME given EROC(g/m) = 12.9

| RC(%) | TC(g) | L(m) | A(g/m) | I(g/m) | S | RCF | INT |
|---|---|---|---|---|---|---|---|
| 198 | 129.4 | 4.7 | 27.5 | 32.7 | -0.971 | 0.9954 | 18 |
| 100 | 65.3 | 2.6 | 25.1 | 32.2 | -0.827 | 0.9951 | 10 |

FINISH vs TIME
RATE vs TIME

FINISH vs TIME
RATE vs TIME

COATED ABRASIVE HAVING BRITTLE AGGLOMERATES OF ABRASIVE GRAIN

BACKGROUND OF THE INVENTION

This application is a continuation-in-part of my co-pending application Ser. No. 931,035, filed Aug. 4, 1978 now abandoned.

This invention relates to abrasive agglomerates particularly suitable for the production of coated abrasive products which provide a fine finish to the metal being abraded.

For many years the coated abrasive industry has worked with various agglomerated abrasive grains as abrasive grits to be used in the manufacture of coated abrasive products. Typical of the older patents in this area is the Jackson patent U.S. Pat. No. 2,194,472 issued Mar. 26, 1940. In this patent fine abrasive grits are held together by a very minor percentage (on the order of 2%–5%) of an organic or clay bond. The formed aggregates are then bonded to the surface of a sheet by a normal "maker" adhesive. Another patent in this same general area is Brown U.S. Pat. No. 2,358,313 issued Sept. 19, 1944 wherein fine aluminum oxide grains are preferably mixed with a lesser amount of garnet and then fired to vitrify the garnet to form relatively large bodies of agglomerated aluminum oxide and fused garnet. These bodies are then crushed and graded to obtain the abrasive aggregates. A later patent is the Ball et al U.S. Pat. No. 2,740,239 issued Apr. 3, 1956 which shows the use of the Jackson type agglomerates on an open mesh abrasive product. More recent activity is represented by Howard and Sowman U.S. Pat. No. 3,916,584 issued Nov. 4, 1975, Wagner U.S. Pat. No. 3,928,949 issued Dec. 30, 1975 and Lohmer German Auslegeschrift No. 26 08 273 published Sept. 8, 1977. The Wagner patent shows hollow organic spheres whose surfaces carry a layer of a very fine abrasive. These spheres are then secured to the surface of the backing to form a coated abrasive product. The Howard et al patent shows composite abrasive agglomerates in which very fine, hard, abrasive grains are distributed through a porous metal oxide matrix which is formed by sintering. The Lohmer German patent shows a number of abrasive agglomerates formed with an organic bonding matrix which is porous. The product may also contain an active filler in the agglomerate. The most recent U.S. patent in this general area is Oberbichler U.S. Pat. No. 4,021,208 issued May 3, 1977. While this patent appears primarily to be directed to a grain for bonded abrasive products, such as grinding wheels, it does have a statement that it can be utilized for abrasive coated paper. In this Oberbichler patent there is no bonding agent, as such, for bonding the fine abrasive aluminum oxide grains together; rather the aluminum oxide is sintered to form a porous compact and the pores are thereafter at least partially filled with an active filler such as a halide, sulfide or the like.

BRIEF SUMMARY OF THE INVENTION

The present invention provides abrasive grits and coated abrasive products made therefrom where the grits constitute agglomerates of fine abrasive grains, there being preferably many abrasive grains in each grit. The abrasive grains are held in the agglomerates by an inorganic, brittle, matrix bond, the volume percent of the bond solids being from 45% to 75% of the total solids content in the the abrasive. This brittle matrix bond has a high thermal conductivity relative to the organic resins of the maker and size coats and the product has a higher total heat capacity than such product without the brittle matrix bond so that the abrasive operation runs cooler than a comparable product operating without brittle matrix bond. The agglomerates preferably have a crush strength (as measured by the "crush test" described hereinafter) of less than $$\frac{20 \text{ lbs./in}^2}{\text{mil}}$$

but greater than $$\frac{10 \text{ lbs./in}^2}{\text{mil}}.$$

The matrix preferably has a hardness of less than about 4 on the Mohs scale. They are sufficiently friable so that they can be broken down by rubbing between the thumb and forefinger. The agglomerates have an irregular surface resulting in a bond to the maker and size coats which permits a gradual wearing-down of the agglomerates during grinding by gradual removal of dulled abrasive grain from the agglomerates, rather than permitting the pulling out of the entire agglomerate from its bond to the backing.

There are two preferred general classes of matrix bonds suitable for this invention; both include a grinding aid salt. The first matrix bond consists essentially of a fused grinding aid salt or a mixture of salts including at least one grinding aid salt. The second bond consists essentially of a silicate which contains a grinding aid salt. In this latter case the bond is not fused. In the first type of bond, i.e. fusion bond, the grinding aid salt is preferably, but not exclusively, one which has some solubility for the aluminum oxide abrasive grain so as to measurably dissolve the grain and provide rounded corners to the individual fine grains. This has the effect of providing for a very fine finish on the ground metal.

The expression "grinding aid salt" is intended to include those salts which react with the metal being ground to prevent loading of the abrasive belt, to increase the rate of cut, or to prevent rewelding of the hot metal to the piece from which it has just been removed. In those cases where the metal is stainless steel, for example, the simple and complex halides have been proven to be very effective grinding aids. Where the metal is carbon steel an oxygen supplier such as a perchlorate may serve the grinding aid function.

THE DRAWINGS

Figures 1, 1A:
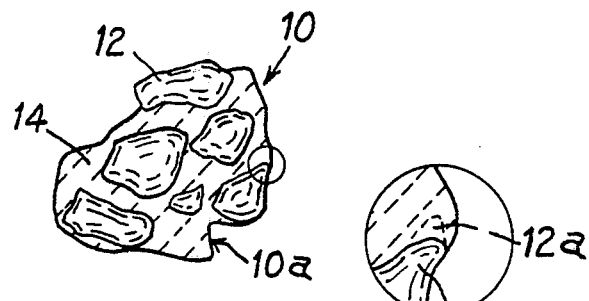
FIGS. 1, 1a and 2 are schematic, diagramatic and greatly enlarged cross-sectional view of the agglomerates of the present invention.

Referring to FIG. 1 the abrasive agglomerate is indicated by the numeral 10 as containing fine abrasive grits 12 held in a binder matrix 14. As can be seen in FIG. 1 the abrasive grains are randomly oriented in the agglomerate; however the agglomerate does have rough corners 10a which permit formation of a strong mechanical bond to the maker and size coats used in normal coated abrasive manufacturing techniques.

FIG. 1a is an enlarged diagramatic view of a portion of FIG. 1 showing in dotted lines at 12a the initial outline of an aluminum oxide abrasive grain and in full lines the rounded off corners of this grain resulting from a partial solution of the grain in the molten matrix binder e.g. when the binder is a solvent for aluminum oxide, such as is the case with cryolite.

Figure 2:
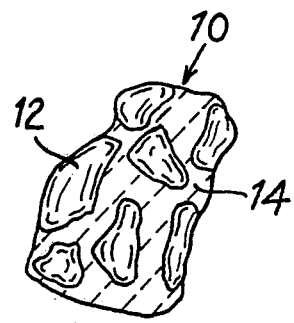

FIG. 2 is similar to FIG. 1 but in this case the product is formed by coating a mud-like paste of the silicate binder onto a carrier substrate under a knife blade thus giving some orientation to the aluminum oxide grains within the agglomerate.

DESCRIPTION OF THE PREFERRED EMBODIMENTS

As mentioned previously there are two preferred embodiments of the invention, both involving an active filler, either as the bond for the fine abrasive grain, or as a major constituent thereof. In the first embodiment the matrix bond comprises cryolite which is melted with the desired fine (less than 200 microns) abrasive grains. The molten mass is then cooled and crushed to the desired grit size and then formed into coated abrasive products using maker and size coats. In a preferred embodiment the size coat is a friable resin filled beyond the critical pigment volume with a powdered grinding aid such as cryolite.

EXAMPLE I 1500 grams of 150 grit fused crushed aluminum oxide and 1500 grams of cryolite ($Na_3AlF_6$) were thoroughly mixed and then fused in a clay-graphite container at a temperature of 1050°–1100° C. The fused mixture was cooled to room temperature and then crushed into "50" grit and "80" grit size agglomerates. The aluminum oxide came from Norton Company and is sold as their commercial grade E296 having an average particle size of ∼100 microns and grading specifications as determined by the Coated Abrasives Manufacturers Institute (CAMI). The cryolite had an average particle size of 15 microns and was obtained from Kryolitselskabet Oresund S/A of Denmark. Cryolite has a Mohs hardness of about 2.5. The "50" grit and "80" grit agglomerates were then coated on cloth belts having a normal maker coat of phenolic resin and about one half of the thickness used for a conventional 150-grit grain. The size coat was a friable, cryolite-overfilled phenolic resin. Two types of size coats were used, one designated 8169 contained 428 parts by weight of a phenolic resin 8169-C (obtained from Varcum Division of Reichhold Chemical Company), 1428 parts of cryolite S, 200 parts of water, 80 parts of "Solox" (a denatured ethyl alcohol containing benzene and kerosene) and 10 parts of "Santocel Z", a silica gel. The second size coat is designated 2955 and contained 666 parts by weight of Varcum 2955 (a phenolic resin obtained from Varcum Division of Reichhold), 2142 parts of cryolite S, 450 parts of water and 200 parts of "Solox". The amount of the 80 grit and 50 grit agglomerates on the products were 18 lbs/ream and 22 lbs/ream, or about 270 g/$m^2$ and 330 g/$m^2$, respectively. This was calculated to give 135 grams and 165 grams of 150 grit aluminum oxide per square meter of cloth, respectively. A commercial "Resinall Metalite" Type 8 coated abrasive sold by Norton Company was obtained as a standard control product. This had been coated with 150 grit aluminum oxide with about 15 lbs/ream or 220 grams per square meter of aluminum oxide grain. The experimental product and standard were then tested on 1018 steel and 304 stainless steel in accordance with the following procedure.

Belt Testing

Approximately ten workpieces of either 1018S or 304SS were pre-roughed on a modified bench backstand grinder by an appropriate coarse-grit belt. The belt chosen would provide a scratch pattern of 250–300 microinches ($\mu$-in) for subsequent testing of 150 grit products, or 150–220 $\mu$-in for testing of 220 grit products.

The sample belts, containing either agglomerate grain systems or conventional control grains, measured $2\frac{1}{2}"\times 60"$ and were tested on the same grinder used for pre-roughing. The traverse or scan speed of the contact wheel was 7 surface feet per minute (SFPM), while the belt speed was 5000 SFPM for 1018S and 3000 SFPM for 304SS. In all cases, the direction of motion of the belt was parallel to the long axis of the workpieces.

Workpieces were bar stock that measured approximately $1"\times 2"\times 10"$; these were tested on their $1"\times 10"$ side, and scanned back and forth for their entire $10"$ length, which required a total period or interval of 15-sec. Grinding was conducted under the constant force of 10 lb or 20 lb dead weights that provided constant interfacial pressures of 20 to 40 psi, assuming $\frac{1}{2}$ $in^2$ of belt was in contact with the workpiece.

Each pre-roughed workpiece was used in three such fifteen-second test intervals, with weight loss in grams and finish readings in $\mu$-in. recorded after each interval. This could have allowed estimates on rate of finish refinement, but in almost all cases the first interval in each set of 3 was sufficient to bring the finish readings down to their equilibrium value at the pressures and interval durations used here. Between sets of 3 intervals, "old" workpieces were removed and "new" pre-roughed workpieces were emplaced.

Twenty to fifty such intervals thoroughly characterized cut and finish behavior, but the preferred endpoint for testing was based on rate-of-cut. Testing for any product was stopped after that interval in which the rate-of-cut (i.e., grams loss) was less than a predetermined fraction of the rate-of-cut of the control product in its first interval, (IROC)c. This predetermined fraction was $\frac{1}{4}$, $\frac{1}{3}$, or $\frac{1}{2}$ the (IROC)c, depending on the type of test and other conditions. However, $\frac{1}{3}$ was most commonly used.

The data thus generated were used in a computer program to provide several types of characterizing numbers, such as relative cut, total cut in grams, life in minutes, extrapolated initial cut, average rate-of-cut, and slope of the function log (cumulative cut) vs log (1/time). The latter has been shown to be a straight line for almost all realistic product testing situations. The parameters are defined in the Glossary of Terms following Table I. Analogous characterizing numbers were also generated for finish behavior using a modification of the same computer program. The results of these tests are shown in Table I.

Disc Testing

Several workpieces of 1018 steel were pre-roughed with a slightly worn, $7"$, 24 grit NORZON ® disc on a bench-mounted disc grinder. This provided a 250–350 $\mu$-in scratch pattern. Other relevant conditions were: disc r.p.m.=3450; angle between the plane of the disc and the workpiece=10°; disc scan rate=7 SFPM; workpiece dimensions=$\frac{1}{4}"\times 3"\times 15"$.

Sample testing with agglomerate grain systems and conventional control grains was performed using 7" discs in single, one-minute intervals. This required the discs to scan back and forth approximately eight times. A 15-lb dead weight provided about 9 p.s.i. interfacial pressure on the 3"-side of the workpieces. These were renewed at each interval after weight loss and finish readings were taken.

The determination of end point was the same as that for belt testing, and the same computer program was used for data reduction of cut and finish behavior.

TABLE I

Test Results with 1:1 Cryolite-to-150 Grit $Al_2O_3$ Fusion Agglomerates at 40 psi Test Pressure

| Product Grit Size/Type | Size Coat | Metal | RC (%) | TC (g) | RL | L (m) | A (g/m) | I (g/m) | $S_c$ | $S_F$ | $\overline{F}$ (μ-in) |
|---|---|---|---|---|---|---|---|---|---|---|---|
| 150 $Al_2O_3$ | Standard Control | 1018S | 100 | 49 | 1.0 | 1.8 | 27 | 31 | −.87 | −.88 | 48 |
| 80g Agg | 8169 Size | 1018S | 236 | 117 | 2.3 | 4.2 | 28 | 33 | −.94 | −.78 | 41 |
| 80g Agg | 2955 Size | 1018S | 273 | 135 | 2.4 | 4.3 | 32 | 38 | −.92 | −.85 | 44 |
| 50g Agg | 8169 Size (FIG. 3) | 1018S | 437 | 216 | 4.0 | 7.2 | 30 | 37 | −.94 | −.85 | 51 |
| 150 $Al_2O_3$ | Standard Control | 304SS | 100 | 9.6 | 1.0 | 1.0 | 9.4 | 9.3 | −.71 | −.86 | 57 |
| 80g Agg | 8169 Size (FIG. 4) | 304SS | 364 | 35.0 | 2.8 | 2.8 | 12.6 | 15.2 | −.90 | −.84 | 50 |
| 80g Agg | 2955 Size | 304SS | 355 | 34.1 | 2.7 | 2.7 | 12.6 | 15.7 | −.86 | −.83 | 52 |
| 50g Agg | 8169 Size | 304SS | 502 | 48.2 | 3.9 | 3.9 | 12.3 | 15.7 | −.85 | −.89 | 64 |

In the above table and in the drawings the abreviations have the following meanings:

GLOSSARY OF TERMS

| | |
|---|---|
| EROC (g/i) or EROC (g/m) | = The ending rate of cut, in either grams per interval or grams per minute, chosen as the "end point" for a specified test and product: Usually determined as the average of measured initial rates of cut divided by 3, but any divisor can be used; the EROC could also be selected arbitrarily. |
| RELCUT (%) ([or RC (%)]) | = The relative total cut, in percent, of the test product compared to a control or reference product. |
| TOTCUT (g) [or TC (g)] | = The total cut in grams achieved upon reaching the EROC: determined by linear interpolation when between testing intervals. |
| LIFE (m) [or L (m)] | = The elapsed time in minutes for a product to reach the EROC: determined by linear interpolation when between testing intervals. |
| AROC (g/m) [or A (g/m)] | = The average rate of cut in grams per minute shown by a product over its lifetime; defined as TOTCUT ÷ LIFE. |
| IROC (g/m) [or I (g/m)] | = The approximate true initial rate of cut, derived from extrapolating function log (cumulative cut) versus log (1/cumulation time). |
| SLOPE [or S,] $S_c$ | = The slope of the log/log function (above): Ranges between −0.000 and −1.000; the closer the value is to −1.000, the better, meaning that a product loses rate-of-cut more slowly. |
| REGCOEF [or RCF] | = The regression coefficient of the log/log function: an indicator of how well the function describes the data. If this value is 1.000, the fit is perfect; if less than "two nines" (0.9900), then the function may not be suitable. |
| INTERVALS [or INT] | = The chosen number of intervals upon which to base the IROC (g/m) and slope, for which the REGCOEF measures the "goodness" of fit. This number of intervals usually is chosen to be at least 5, but also one or two intervals short of the EROC. |
| RL (REL LIFE) | = The ratio of the LIFE in minutes of test product to the LIFE in minutes of control product. |
| $S_F$ | = The slope of the log/log function above as applied to finish readings in micro-inches on the substrate metal, i.e. slope of log (cumulative finish) vs log (1/time). |
| $\overline{F}$ | = The average finish in micro-inches on the substrate metal over a product's lifetime. |

Figure 3:
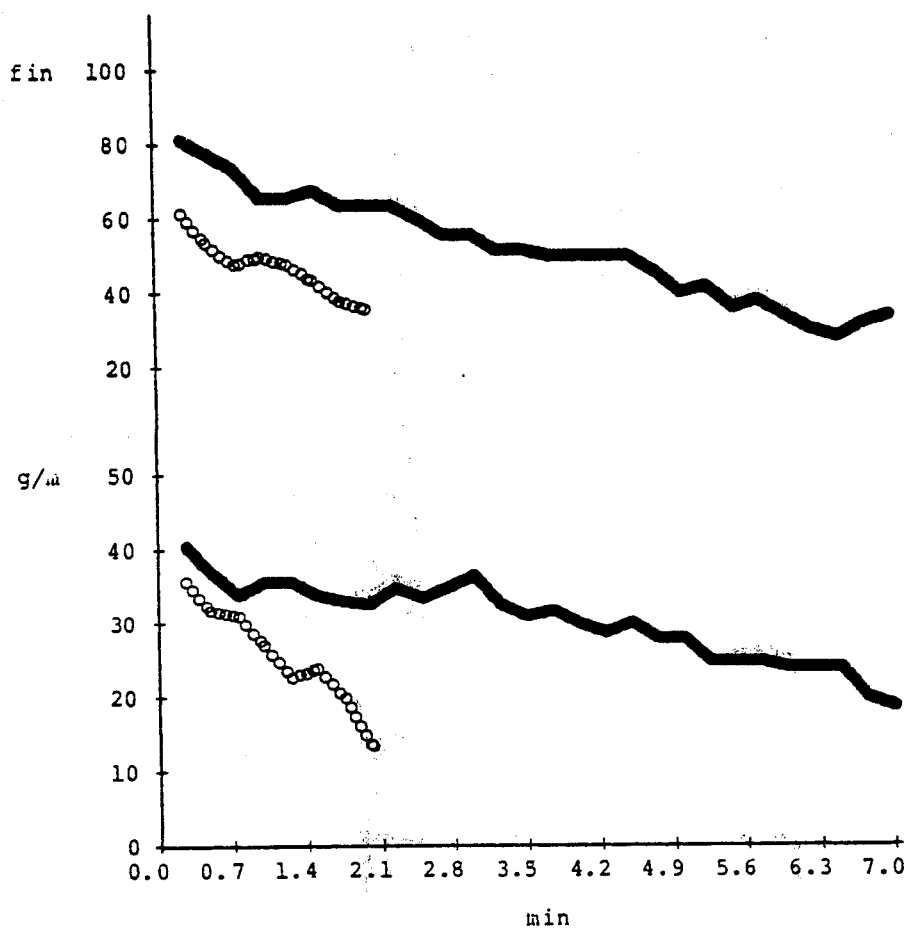
FIGS. 3 through 9 are graphs showing relative performance of coated abrasive products made in accordance with the present invention as compared to commercially available products used as "controls".
Figure 4:
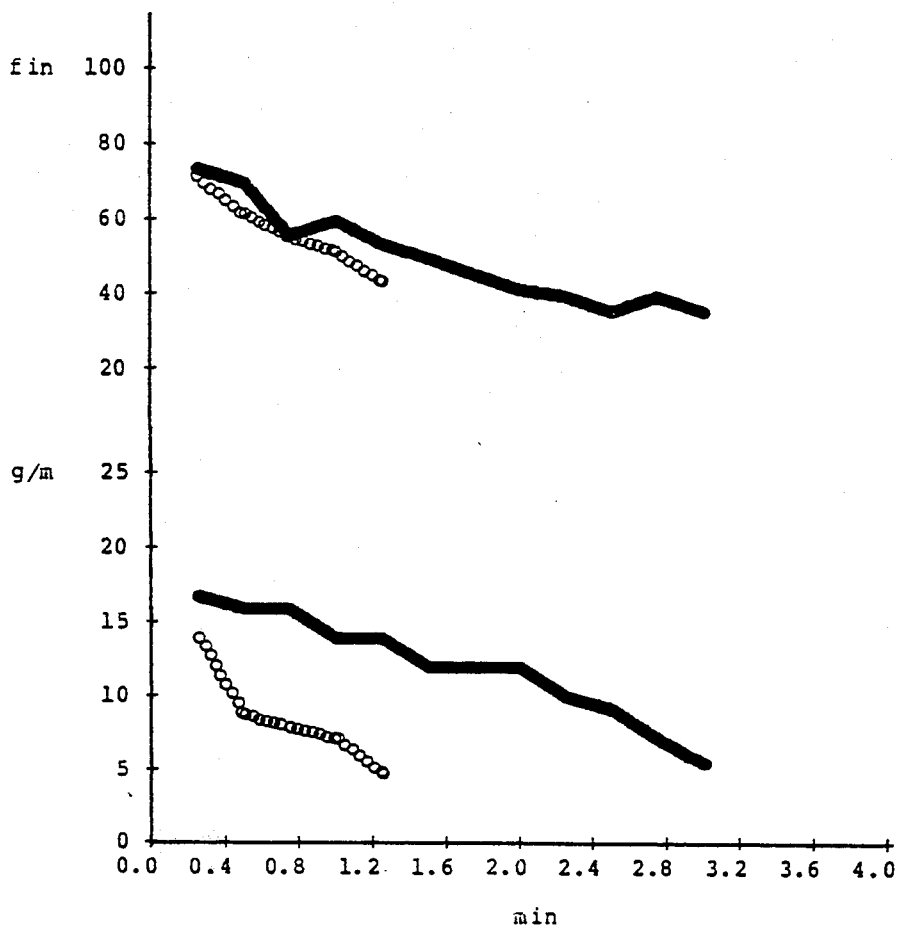

As a visual example, FIG. 3 shows the performance results of one test product from Table I (solid line) compared with the control product (open circles) on the 1018 steel. FIG. 4 shows the test results of another of these products (80 grit) tested against 304 stainless steel.

EXAMPLE II

In this case 220 grit aluminum oxide is used in place of the 150 grit aluminum oxide of Example I. It was also obtained from Norton Company. The aluminum oxide had an average particle size of about 70 microns, and conventional grading specifications as determined by Coated Abrasives Manufactures Institute. The cryolite was the same as that used in Example I; however the weight ratio of cryolite to $Al_2O_3$ was 3:2 rather than than 1:1 of Example I. This material was coated to an agglomerate weight of 16 lbs/ream or 96 grams per square meter of aluminum oxide on abrasive belts, and given a size coat with resins similar to those in Example I. A conventional product exhibits a grain weight of about 12 lbs/ream or 180 g/m² of aluminum oxide grain. These products were tested on 1018 steel and 304 stainless steel at 20 and 36 p.s.i. The results of these tests are shown in Table II below.

TABLE II

Test Results with 3:2 Cryolite-to-220 $Al_2O_3$ Grain Fusion Agglomerates

| Product Grit Size/Type | Size Coat | Metal/PSI | RC (%) | TC (g) | RL | L (m) | A (g/m) | I ($g_m$) | $S_c$ | $S_F$ | $\overline{F}$ (μ in) |
|---|---|---|---|---|---|---|---|---|---|---|---|
| 220 $Al_2O_3$ | Standard Control | [1018S,] [20 psi] | 100 | 33.5 | 1.0 | 2.8 | 11.8 | 15.9 | −.82 | −.87 | 31 |
| 120 Agg, | 8169 Size | | 169 | 56.4 | 1.9 | 5.4 | 10.4 | 12.0 | −.96 | −.83 | 30 |

TABLE II-continued

Test Results with 3:2 Cryolite-to-220 Al₂O₃ Grain Fusion Agglomerates

| Product Grit Size/Type | Size Coat | Metal/PSI | RC (%) | TC (g) | RL | L (m) | A (g/m) | I (g$_m$) | S$_c$ | S$_F$ | $\overline{F}$ (μ in) |
|---|---|---|---|---|---|---|---|---|---|---|---|
| 120 Agg, | 2955 Size | | 198 | 66.4 | 2.1 | 5.9 | 11.3 | 12.9 | −.98 | −.86 | 30 |
| 220 Al₂O₃ | Standard Control | [1018S,] [36 psi] | 100 | 31.2 | 1.0 | 1.4 | 22.1 | 25.8 | −.80 | −.91 | 33 |
| 120 Agg, | 8169 Size | | 173 | 54.0 | 1.9 | 2.7 | 19.9 | 21.5 | −1.03 | −.80 | 32 |
| 120 Agg, | 2955 Size | | 189 | 59.0 | 1.9 | 2.7 | 21.6 | 24.3 | −.99 | −.86 | 32 |
| 220 Al₂O₃ | Standard Control | [304SS] [20 psi] | 100 | 4.9 | 1.0 | 1.1 | 4.4 | 4.7 | −.67 | −.94 | 34 |
| 120 Agg, | 8169 (FIG. 5) | | 625 | 30.9 | 5.2 | 5.7 | 5.4 | 6.7 | −.95 | −.88 | 28 |
| 120 Agg, | 2955 Size | | 576 | 28.4 | 4.7 | 5.2 | 5.4 | 7.2 | −.88 | −.86 | 29 |

Figure 5:
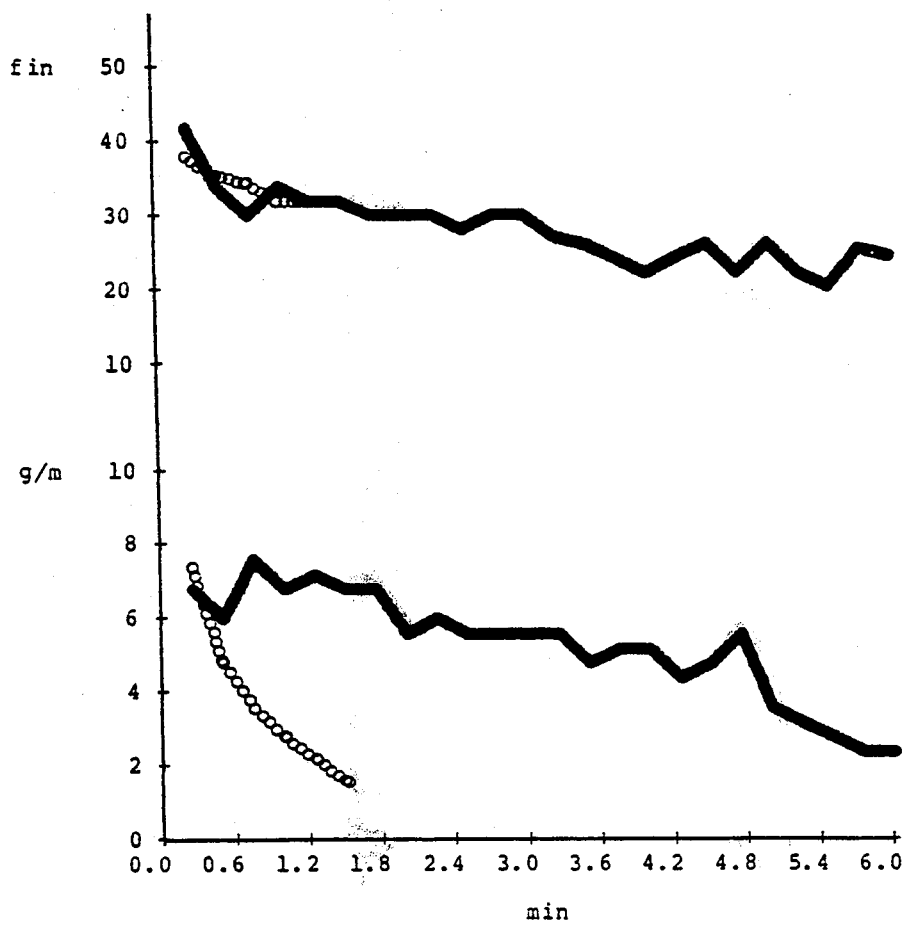

FIG. 5 shows an example of one test product from Table II as compared to the control product on 304SS at 20 p.s.i.

EXAMPLE III

In the second system for forming the abrasive agglomerates of the present invention, the binder is a silicate containing an active filler such as cryolite. In the preferred embodiment, 2 parts by weight of grain such as 150 grit aluminum oxide of the type utilized in Example I above are mixed with 2 parts of cryolite of the type described in Example I, and with 1 part of potassium silicate solution (38% solids) sold by Sauereisen Cements Company, Pittsburgh, Pennsylvania under the designation Binder #65. These silicates upon cure normally have a Mohs hardness of less than 2. This produced a mixture having the consistency of mortar which was then deposited in the form of circular discs 1–3 inches in diameter and ⅛–1 inch thick on a silicone-release substrate, dried in a hot-air oven at 250° F., and crushed to about 80 grit size. A similar batch was prepared utilizing a 8:4:3 by weight ratio of cryolite to 150 grit aluminum oxide to Binder #65. Both formulations were then formed into products of coated abrasive belts utilizing the same general techniques described in Example I above. They were tested against a commercial 150 grit aluminum oxide belt sold by Norton Company under the designation Resinall Metalite Type 8. The test results from these two experimental products against the commercial standard on 1018 steel and 304 stainless steel are shown in Table III.

EXAMPLE IV

In another embodiment of the second system for forming abrasive agglomerates of the present invention, the silicate binder and cryolite are premixed with a solution containing a surface active agent. These have been termed "Silicate Paste Binder" or SPB agglomerates. In the preferred embodiment, grain such as 150 grit aluminum oxide of the type in Example I is added to the above pre-mixture to form a thixotropic or shear-thinning paste which was then coated under a knife on silicone-release paper to a wet thickness of about ⅛". The paste on its coated paper was cured to a semi-dry, rubbery state for 20–30 minutes at 275°–300° F. and drawn through a roll flexer to break the resulting "green-state" crude into 2" long×½" wide strips. The strips were collected on trays and heat soaked for >2 hrs. at 250° F. The formulation of the preferred embodiment on a weight basis is 38 parts cryolite; 32 parts 150 A/O grain; 24 parts #65 Silicate Binder (38% solids solution); and 2 parts of 0.2% Aerosol OT solution. Aerosol OT is manufactured by American Cyanamid Corporation. Other organic and inorganic surface active materials could be used as well. The fully cured crude was crushed to about 70 grit sizes and made into both abrasive cloth belts and vulcanized fiber discs. Results from testing on belts are similar to those in Table III. Results from testing with fiber discs are shown in Table IV.

Included also in Table IV are results from testing of fiber discs coated with cryolite fusion agglomerates

TABLE III

Test Results with Silicate Binder Agglomerates Using 150 Al₂O₃ Grain at ~40 p.s.i.

| Product Grit Size/Type | Ratio* | Size Coat | Metal | RC (%) | TC (g) | RL | L (m) | A (g/m) | I (g/m) | S$_c$ | S$_F$ | $\overline{F}$ (μ-in) |
|---|---|---|---|---|---|---|---|---|---|---|---|---|
| 150 Al₂O₃ | | Standard Control | 1018S | 100 | 65 | 1.0 | 2.6 | 25 | 32 | −.83 | −.86 | 38 |
| 80 Agg, | 2:2:1,* | 8169 | 1018S | 183 | 119 | 1.6 | 4.2 | 28 | 34 | −.95 | −.80 | 38 |
| 80 Agg, | 2:2:1, | 2955 (FIG. 6) | 1018S | 198 | 129 | 1.8 | 4.7 | 28 | 33 | −.97 | −.91 | 39 |
| 80 Agg, | 8:4:3, | 8169 | 1018S | 218 | 143 | 2.2 | 5.7 | 25 | 25 | −1.08 | −.94 | 46 |
| 80 Agg, | 8:4:3, | 2955 | 1018S | 207 | 136 | 1.7 | 4.5 | 30 | 32 | −1.04 | −.90 | 54 |
| 150 Al₂O₃ | | Standard Control | 304SS | 100 | 12 | 1.0 | 1.6 | 7.6 | 9.0 | −.70 | −.88 | 45 |
| 80 Agg, | 2:2:1,* | 8169 | 304SS | 556 | 66 | 3.6 | 5.8 | 11.3 | 17.0 | −.83 | −.95 | 46 |
| 80 Agg, | 2:2:1, | 2955 | 304SS | 577 | 68 | 3.8 | 6.1 | 11.2 | 18.1 | −.79 | −.89 | 45 |
| 80 Agg, | 8:4:3, | 8169 (FIG. 7) | 304SS | 593 | 70 | 3.9 | 6.3 | 11.1 | 14.1 | −.93 | −.97 | 41 |
| 80 Agg, | 8:4:3, | 2955 | 304SS | 671 | 79 | 4.3 | 6.9 | 11.5 | 16.8 | −.87 | −.85 | 40 |

*2:2:1 = 2 cryolite  2 grain  2 binder
8:4:3 = 8 cryolite  4 grain  3 binder

Figure 6:
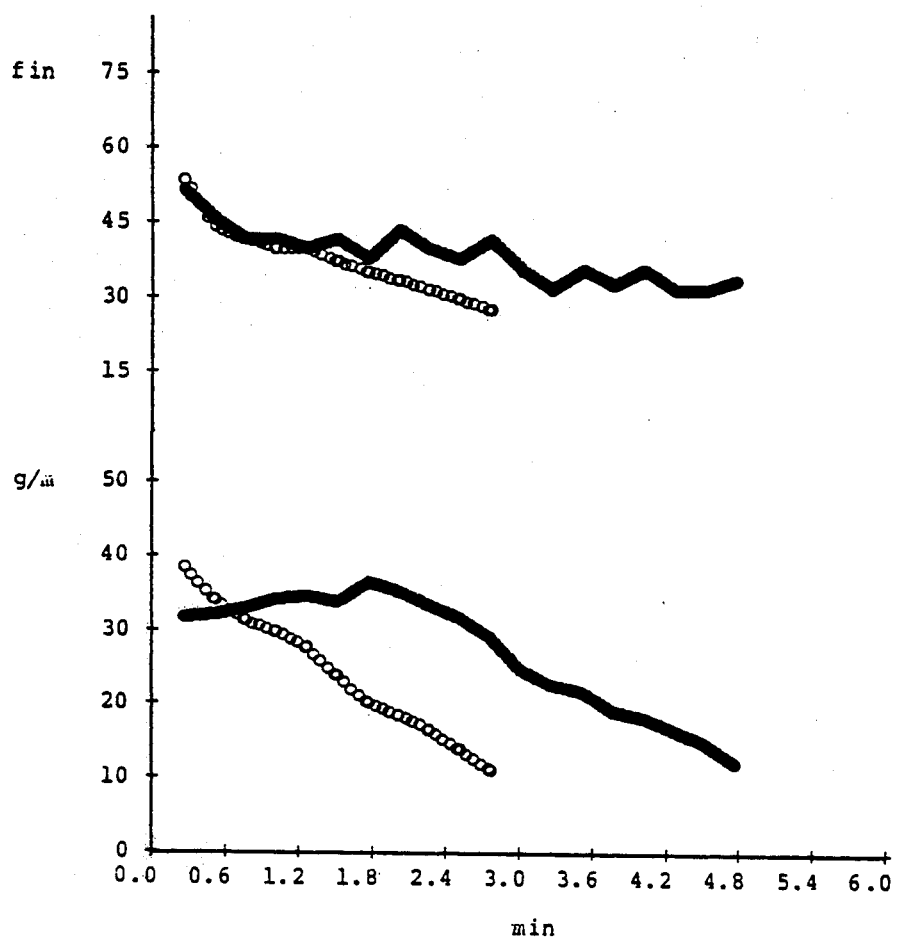
Figure 7:
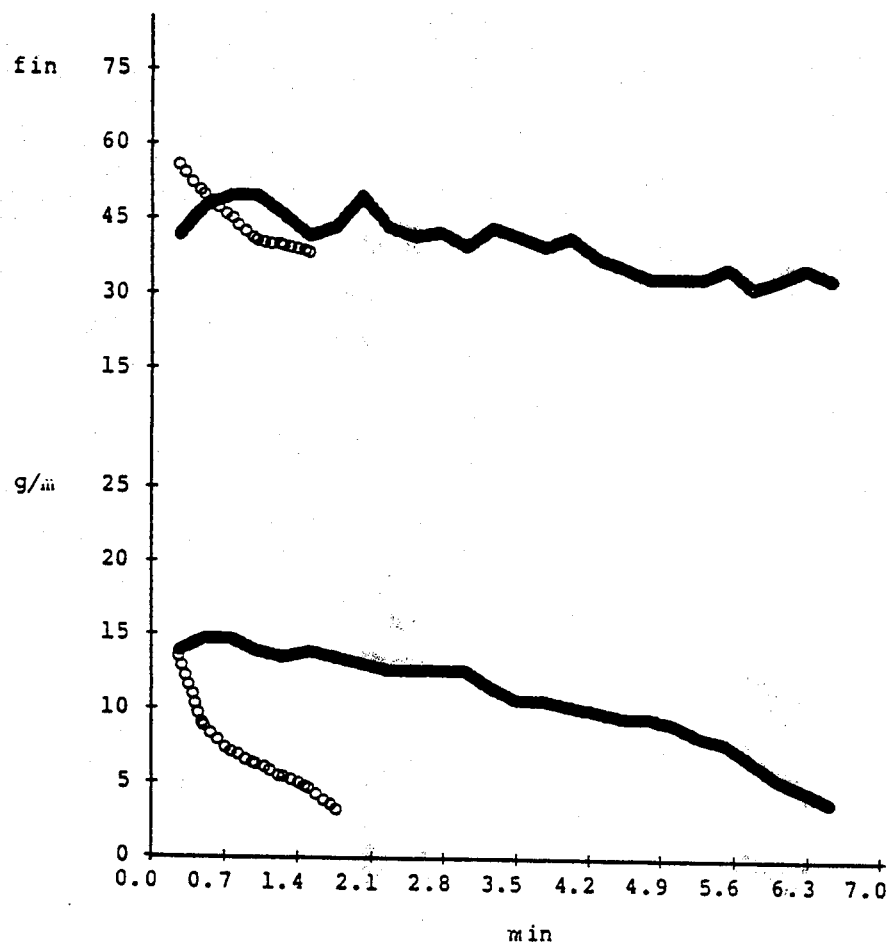

FIG. 6 shows an example of one test product from Table III using the 2:2:1 formation as compared to the control product on 1018 steel. FIG. 7 shows an example of one test product from Table III using the 8:4:3 formulation as compared to the control product on 304SS.

made essentially as in Example I but on a batch scale of hundreds of pounds and using the formulation 55:45 cryolite: 150 A/O grain. These were crushed to about 90 grit sizes.

Figure 8:
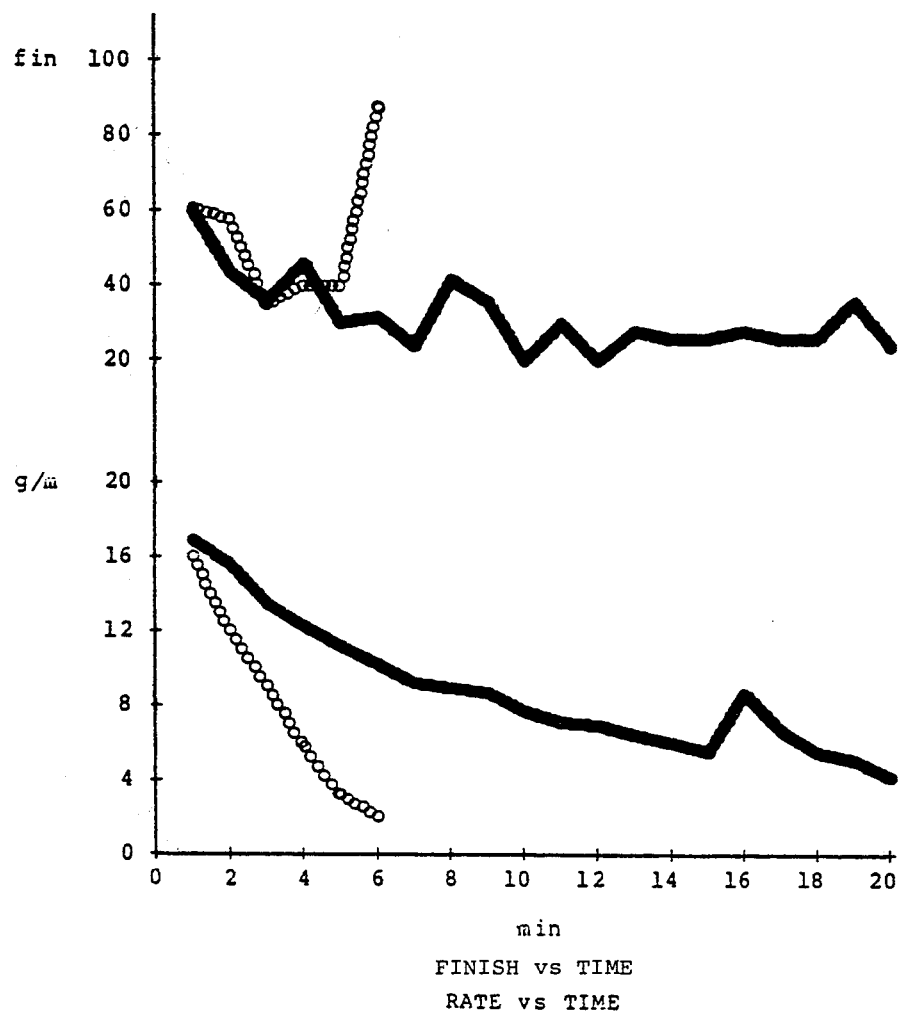
Figure 9:
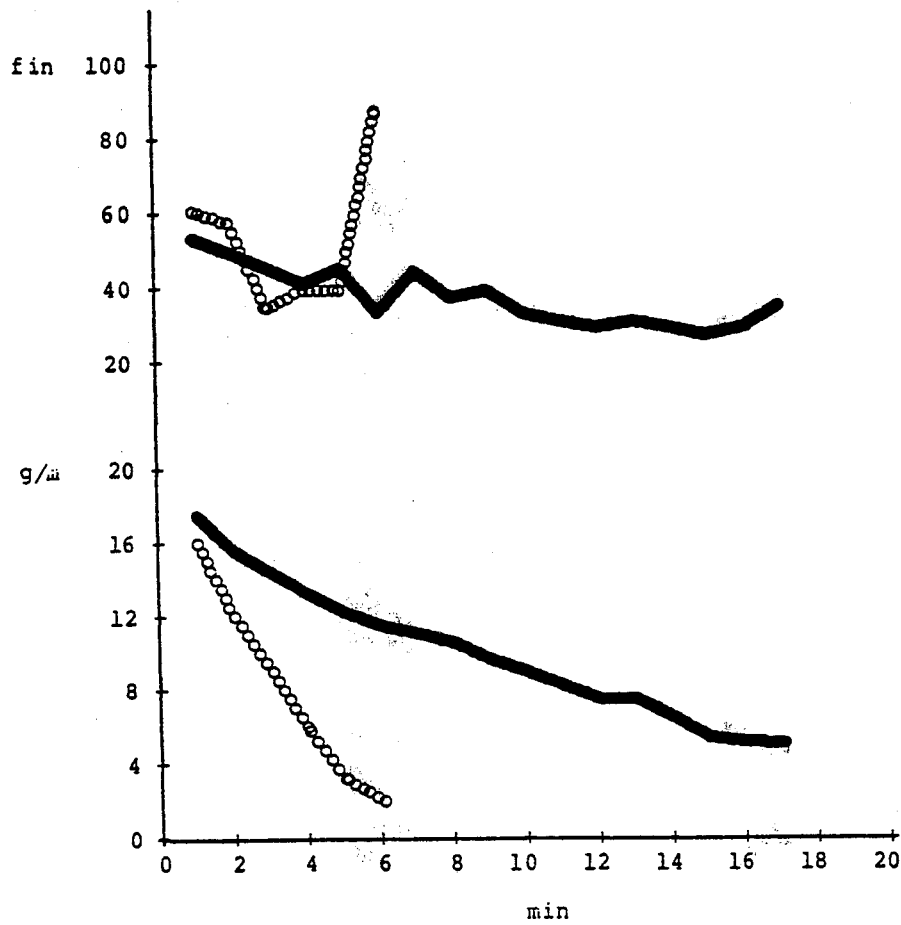

FIG. 8 shows the performance on 1018S of one test product from Table IV using the Silicate Paste Binder (SPB) formulation compared to the 150 grit control product, Resinall Fiber Disc, Type 6 manufactured by Norton Company. FIG. 9 shows the performance on 1018S of another test product from Table IV that used the large batch fusion agglomerates with 55:45 formulation compared to the same control used in FIG. 8.

"Crush Test"

In order to characterize the agglomerates and differentiate these products from agglomerates of the prior art, the following test method was developed. Agglomerates whose crush strength is to be measured are vibrated into a settling cell which has an internal cylindrical diameter of ½" and is 1" deep. This 1" by ½" cylinder is then completely filled and this accurately controlled amount is then deposited and settled into a measuring cell also having a ½" cylindrical diameter but of greater depth. A compression piston of ½" diameter is fitted into the measuring cell after the deposited agglomerates have been vibrated into maximum loose pack density. An Instron Stress Strain Tester having a 1000 lb. force cell and a compression cage was used with a cross head speed of 0.5 inches per minute. The amount of compression in mils was measured at 50 lb. force and at 500 lb. force levels, and the difference was divided into the difference in force per cell area, e.g. 450 lbs. divided by 0.1963 in$^2$ divided by the measured mils of compression. Measured data were taken from a strip chart recorder attached to the Instron Tester. The test data obtained are listed in Table VI below.

the agglomerate rather than the grit size of the individual grains making up the agglomerate.

The present invention has many advantages, enumerated below, which contribute to a greatly improved product. While many of these advantages are present, individually, in the prior art none of the prior art, so far as is known, contains all of these advantages grouped together. These advantages include:

1. Cooler grinding operations. The product of the present invention can provide cooler grinding (e.g. lower temperature sparks, workpieces, and abrasive products) than comparable grinding utilizing the same abrasive grit in the same grinding operation but without the agglomerates of the present invention.

2. Controlled gradual attrition of the agglomerates. This arises from the relatively weak intraagglomerate bond of the matrix binder.

3. Intimate contact of a "grinding aid" with the grain-workpiece interface. This results from the fact that the "grinding aid" is either the matrix binder itself or it is present in large quantities in the matrix binder in the preferred embodiment of the invention. This means that the grinding aid is present in the exact place where it is needed. This provides the possibility of using less total grinding aid than is required if the grinding aid is put in the size coating, for example.

4. Longer life from higher attainable grain weights, if desired. Agglomerates permit a higher total amount of grain to be applied to a given area of the coated abrasive product for a given grit size of the individual abrasive

TABLE IV

Test Results with SPB and Cryolite Fusion Agglomerates in Fiber Discs at 9 p.s.i., using 150 Al$_2$O$_3$ Grain

| Product Grit Size/Type | Size Coat | Metal | RC (%) | TC (g) | RL | L (m) | A (g/m) | I (g/m) | $S_c$ | $S_F$ | $\overline{F}$ ($\mu$-in) |
|---|---|---|---|---|---|---|---|---|---|---|---|
| 150 Al$_2$O$_3$ | Standard Control | 1018S | 100 | 43.8 | 1.0 | 4.2 | 10.5 | 16.9 | −.67 | −.87 | 54 |
| 70g Agg, | Ex. IV 8169 | 1018S | 191 | 83.4 | 2.0 | 8.6 | 9.7 | 14.3 | −.85 | −.76 | 45 |
| 70g Agg, | Ex. IV 2955 (FIG. 8) | 1018S | 392 | 171.8 | 4.4 | 18.6 | 9.2 | 19.2 | −.77 | −.78 | 32 |
| 90g Agg, | 55:45* 8169 | 1018S | 306 | 134.1 | 3.2 | 13.5 | 10.0 | 17.9 | −.80 | −.95 | 46 |
| 90g Agg, | 55:45 2955 (FIG. 9) | 1018S | 377 | 165.1 | 3.7 | 15.7 | 10.6 | 19.2 | −.81 | −.87 | 38 |

*55:45 = 55 cryolite: 45 grain

TABLE VI

Crush Strengths of Agglomerates

| | lbs/in$^2$ mil |
|---|---|
| Fusion Agglomerates | |
| 1. 55:45 CR: 150 Al$_2$O$_3$, in ~90g Agg | 15 |
| 2. 1:2 (CR & Bauxite): 150 Al$_2$O$_3$, in ~80g Agg | 18 |
| 3. 1:3 CR: 150 Al$_2$O$_3$, in ~80g Agg | 22 |
| 4. 3:2 CR: 220 Al$_2$O$_3$, in ~120g Agg | 20 |
| Silicate Binder Agglomerates | |
| 1. 2:2:1 CR: 150 Al$_2$O$_3$: S#65, in ~80g Agg | 12 |
| 2. 8:4:3 CR: 150 Al$_2$O$_3$: S#65, in ~80g Agg | 10 |
| 3. EX.IV(38:32:24:2), ~70g Agg 150 Al$_2$O$_3$ | 11 |

Based on these test results, it would appear that the value of 10 is probably the lower limit of crush strength that can be most conveniently handled. If care is taken in utilizing the agglomerate, a somewhat lower crush strength might be used, particularly in those cases where the size coat is somewhat stronger and serves to partially reinforce the agglomerates. With respect to the upper limit of crush strength, while it's possible to go as high as 25 or 30, at these higher crush strengths, the surface finish will suffer and the finish will be more representative of the finish comparable to the grit size of grains. The coated abrasive product can continue to cut long after a single layer of individual grits would have been destroyed. Alternatively, the amount of grain in agglomerates can be reduced far below 50% of the agglomerate weight, resulting in grain weights ranging from ½ to ⅔ those of conventional products while still providing relative cut and life 100% to 500% greater. That is, the agglomerate concept yields a higher grain efficiency, with each abrasive grain able to do more work than in conventional products.

5. Larger and more uniform rates of cut. This stems from the fact that, since the agglomerates are more widely spaced than individual grains, there can be higher unit pressures on each cutting grain as it operates. This provides higher rates of cut, and the wide spacing deters "loading" of the abrasive surface. The longer life of the cut results from the fact that as one individual grain is used up it is torn out of the agglomerate and the next lower abrasive grain starts to go to work.

6. Improved activity in electrostatic fields. Salt matrix agglomerates generally and those based on the silicate binder, in particular, have high activity in an electrostatic field for electrostatic coating of the agglomerates on the fresh maker coat. It has been found that only 8 to 10 thousand volts are required for coating the 80 grit agglomerates of 150 grit aluminum oxide. This contrasts to 25 to 35 thousand volts required for coating regular 80 grit aluminum oxide; 150 grit aluminum oxide requires 15 to 25 thousand volts under the same conditions.

7. Improved anchoring of the agglomerates in the maker and size coats. This results from the sharp corners and edges on the agglomerates to provide a strong mechanical bond to the maker and size coats. This mechanical bond to the maker and size coats is stronger than the intraagglomerate bond between the individual abrasive grains.

8. A finer and more uniform finish behavior than conventional products in the major portion of product lifetime, beyond the break-in period. This results from the fact that individual abrasive grains are very fine and they act as very fine grains during cutting. However, the rate of cut is more typical of the size of the agglomerate rather than the size of the individual grain doing the cutting. The more uniform rate and more uniform finish results from the gradual attrition of the agglomerate. The finer finish also is attributed to the massive amount of matrix binder which is present in the agglomerate to limit the depth of penetration into the workpiece of the individual grains during the grinding action, thereby providing a surface finish comparable to the surface finish utilizing unagglomerated abrasive grains of the grit size of the individual grains in the agglomerates.

While aluminum oxide has been mentioned above in connection with the preparation of these particular abrasive agglomerates, numerous other abrasive materials, such as silicon carbide and the various aluminum oxide alloys (such as alumina zirconia) may be employed. Similarly, other matrix binders can be utilized. The principal requirement for these binders is that the bond between the individual grains has the degree of friability desired to permit discard of the individual abrasive grains after they have become dulled as a result of the grinding operation. It is preferred that the matrix binder be present in each agglomerate in a weight percent of at least 35 and, as mentioned previously, preferably with a volume percent of binder solids of from 45% to 75% of the total solids volume of the agglomerate and that it be an inorganic brittle material. Without intent to limit the invention, the crystalline inorganic materials shown in Table V can be utilized in the fusion system of Example I.

TABLE V

Additional Salt Systems Useful in Fusion Agglomerates*

| Compound | Formula | MP °C. | Sol. H$_2$O (c/Hot) | Density (g/cc) |
|---|---|---|---|---|
| Aluminum Fluoride | AlF$_3$ | 1040 | s/s | 3.07 |
| Calcium Metaphosphate | Ca(PO$_3$)$_2$ | 975 | i/i | 2.82 |
| Potassium Carbonate | K$_2$CO$_3$ | 891 | 112/156 | 2.43 |
| Potassium Chromate | K$_2$CrO$_4$ | 968 | 63/79 | 2.73 |
| Potassium Dichromate | K$_2$Cr$_2$O$_7$ | 398 | 5/102 | 2.69 |
| Potassium Fluoborate | KBF$_4$ | 530 | .4/6.3 | 2.50 |
| Potassium Nitrate | KNO$_3$ | 334 | 13/247 | 2.11 |
| Potassium Fluoride | KF | 880 | 92/V.S. | 2.48 |
| Potassium Sulfate | K$_2$SO$_4$ | 1076 | 12/25 | 2.66 |
| Sodium Carbonate | Na$_2$CO$_3$ | 851 | 7/46 | 2.51 |
| Sodium Fluoaluminate** | Na$_3$AlF$_6$ | 1000 | sl. s. | 2.90 |
| Sodium Dichromate | Na$_2$Cr$_2$O$_7$ | 320 | 180/430 | 2.52 |
| Sodium Tungstate | Na$_2$WO$_4$ | 698 | — | 4.18 |
| Sodium Fluoborate | NaBF$_4$ | 384 | 108/210 | 2.47 |
| Sodium Fluoride | NaF | ~990 | 4.2/- | 2.79 |
| Sodium Nitrate | NaNO$_3$ | 307 | 73/180 | 2.26 |
| Sodium Metaphosphate | NaPO$_3$ | 628 | 21/s | 2.48 |
| Sodium Sulfate | Na$_2$SO$_4$ | 884 | 4/50 | 2.70 |
| Calcium Metaborate | Ca(BO$_2$)$_2$ | 1154 | sl.s | — |
| Calcium Fluoride | CaF$_2$ | 1360 | .0016 | 3.18 |
| Potassium Chloride*** | KCL | 776 | 35/57 | 1.98 |
| Sodium Chloride*** | NaCl | 801 | 36/39 | 2.17 |
| Cuprous Chloride*** | CuCl | 422 | .0062 | 3.53 |
| Zinc Orthophosphate | Zn$_3$(PO$_4$)$_2$ | 900 | i/i | 4.00 |
| Cuprous Fluoride | CuF | 908 | i/- | — |
| Magnesium Chloride*** | MgCl$_2$ | 708 | 54/73 | 2.32 |
| Sodium Disilicate | Na$_2$Si$_2$O$_5$ | 874 | s/s | — |
| Manganese Fluoride (di) | MnF$_2$ | 856 | i/d | 3.98 |

*Values from Hdbk Chem & Phys., 44th Ed., by Chemical Rubber Pub. Co.
**Included for comparison
***Chlorides may cause stress-corrosion cracking in critical applications of some stainless steels.

For the system of the type of Examples III and IV (typified by the use of a silicate solution) non-limiting examples of other materials which can be used in place of, or in addition to, the silicates, with or without conventional mineral fillers, are:

Salt Binder Additions and Substitutions

Sodium Fluoborate (NaBF$_4$);
Plaster-of-Paris (CaSO$_4$.½H$_2$O);
Potassium Orthophosphate (K$_3$PO$_4$);
Sodium Sulfate (Na$_2$SO$_4$);
Calcium Metaborate (Ca[BO$_2$]$_2$);
Sodium Metaborate Peroxyhydrate (NaBO$_2$.H$_2$O$_2$);
Potassium Pentaborate (KB$_5$O$_8$.4H$_2$O);
Potassium Pyrophosphate (K$_4$P$_2$O$_7$.3H$_2$O);
Sodium Tripolyphosphate (Na$_5$P$_3$O$_{10}$);
Potassium Hexafluorophosphate (KPF$_6$);
Potassium Peroxydisulfate (K$_2$S$_2$O$_8$);
Potassium Pyrosulfate (K$_2$S$_2$O$_7$)

In general these are the partially soluble silicates, sulfates, borates and phosphates of alkali metal cations which tend to form complex or "polymeric" inorganic salts.

It is felt that the size coat performs a very significant function in the present invention since it serves to anchor the relatively fragile agglomerates firmly to the coated backing. As a result of the size coat and maker coat combination the mechanical bond to the backing is stronger than the intraagglomerate bond between the individual abrasive grains. Each agglomerate is firmly held so that it can make the individual abrasive grains available to the surface to be ground as the grains at the top surface are gradually dulled and discared. If this mechanical bond is not adequately strong the whole abrasive agglomerate will be ripped from the backing rather than having the individual grains torn from the agglomerate, which is the desired effect. At the same time, the size coat deposited on the sides and top of the anchored agglomerate must be itself friable enough to wear away at matched attrition rates with the agglomerate. In the preferred embodiment, size coats of phenolic resins filled beyond the critical pigment volume ("overfilled") with conventional mineral fillers have provided these characteristics.

As used in the appended claims the term matrix includes all the solids content of the agglomerates except the abrasive grits, and excludes any voids.

While the abrasive agglomerates of this invention are essentially solid, they may accidentally contain an insignificant number of voids. In any case, such voids as may be present in useful agglomerates will be randomly dispersed and will have a maximum diameter of less than the diameter of the abrasive grit in the agglomerate. Such particles as meet the above criteria are herein defined as "essentially solid".

What is claimed is:

1. A coated abrasive product having abrasive particles secured to a flexible backing by maker and size coats, each abrasive particle consisting of an essentially solid agglomerate of fine abrasive grains having an average diameter less than about 200 microns and an inorganic, brittle cryolite, matrix, the volume percent of the matrix in each agglomerate being at least 45% of the total solids volume of the agglomerate, said agglomerates having an irregular surface permitting a strong bond to the maker and size coats which permits gradual wearing down of the agglomerates during grinding by gradual removal of dulled abrasive grains from the agglomerates, the matrix bond serving to limit the depth of penetration into the workpiece of the individual abrasive grains during the grinding action and thereby providing the surface finish comparable to the surface finish utilizing unagglomerated abrasive grains of the grit size of the individual grains in the agglomerates.

2. A coated abrasive product having abrasive particles secured to a flexible backing by maker and size coats, each abrasive particle consisting of an essentially solid agglomerate of fine abrasive grains having an average diameter less than about 200 microns and an inorganic, brittle matrix consisting essentially of fused cryolite and a water soluble silicate, the volume percent of the matrix in each agglomerate being at least 45% of the total solids volume of the agglomerate, said agglomerates having an irregular surface permitting a strong bond to the maker and size coats which permits gradual wearing down of the agglomerates during grinding by gradual removal of dulled abrasive grains from the agglomerates, the matrix bond serving to limit the depth of penetration into the workpiece of the individual abrasive grains during the grinding action and thereby providing the surface finish comparable to the surface finish utilizing unagglomerated abrasive grains of the grit size of the individual grains in the agglomerates.

* * * * *